Figure 1:
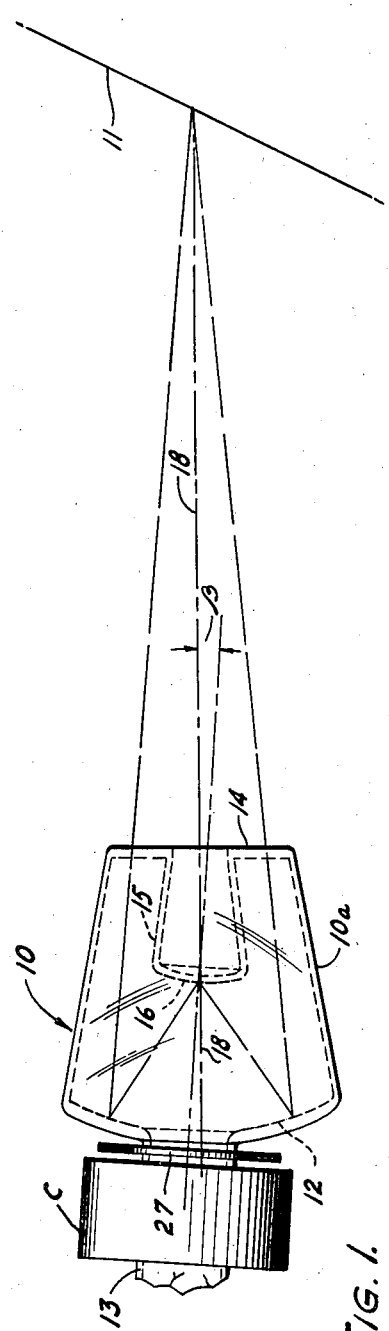

April 19, 1949.    R. D. BROWN, JR    2,467,462
ELECTROOPTICAL PROJECTION APPARATUS
Filed Oct. 22, 1947

INVENTOR.
REYNOLDS D. BROWN Jr.
BY
Brown, Denk & Synnestvedt
AGENTS

Patented Apr. 19, 1949

2,467,462

UNITED STATES PATENT OFFICE 2,467,462

ELECTROOPTICAL PROJECTION APPARATUS

Reynolds D. Brown, Jr., Blue Bell, Pa., assignor to Philco Corporation, Philadelphia, Pa., a corporation of Pennsylvania Application October 22, 1947, Serial No. 781,368

3 Claims. (Cl. 250—161)

The present invention relates to image forming electro-optical apparatus, and is especially concerned with apparatus adapted for use in projection television systems, oscilloscopes, radar apparatus, and the like.

More particularly, the invention has to do with apparatus having reflective optical components of the so-called "Schmidt" type and including a spherical reflector, means for correcting the spherical aberration introduced by said reflector, and a primary image source disposed between said reflector and said correcting means.

In television systems, for example, such apparatus is customarily used in combination with a cathode-ray tube having a fluorescent screen upon which the primary picture is traced by the scanning action of the electron beam, and the composite apparatus, heretofore, has been subject to certain difficulties and disadvantages, particularly in that there is need for precise optical relative positioning of the elements of the Schmidt system and of such elements and the cathode-ray tube. Also, it has proven difficult to maintain the optical efficiency of the spherical mirror and the correcting plate, due to the gradual and inevitable deposition of dust and dirt upon the optical surfaces, as well as to the fact that the surface of the mirror may be subject to corrosion resulting from its contact with the air.

It is therefore a primary object of the present invention to provide a unitary image forming system of the aforesaid type, in which the requisite relative positioning and focusing are established during manufacture of the apparatus and require no subsequent adjustment.

Additionally, it is an important object of the invention to provide an image forming optical system in which the optical elements are completely sealed against the entrance of dust, air or moisture.

A further object of the invention resides in the provision of apparatus of the foregoing type in which the primary image is traced upon the outer face of a fluorescent screen disposed in direct confronting relation with the spherical mirror, the light passing through no glass surfaces other than those required for optical purposes.

In general, the invention has as an object the provision of such apparatus, which is of higher optical efficiency than has heretofore been possible and is of such a nature that the optical efficiency is maintained throughout the operating life of the apparatus.

To the foregoing general ends, the invention contemplates a combined cathode-ray tube and Schmidt system in which an evacuated tube, or envelope, houses the complete electro-optical "train" from the gun to the correcting plate, which latter constitutes a source from which light is projected directly upon a suitable screen.

Figure 2:
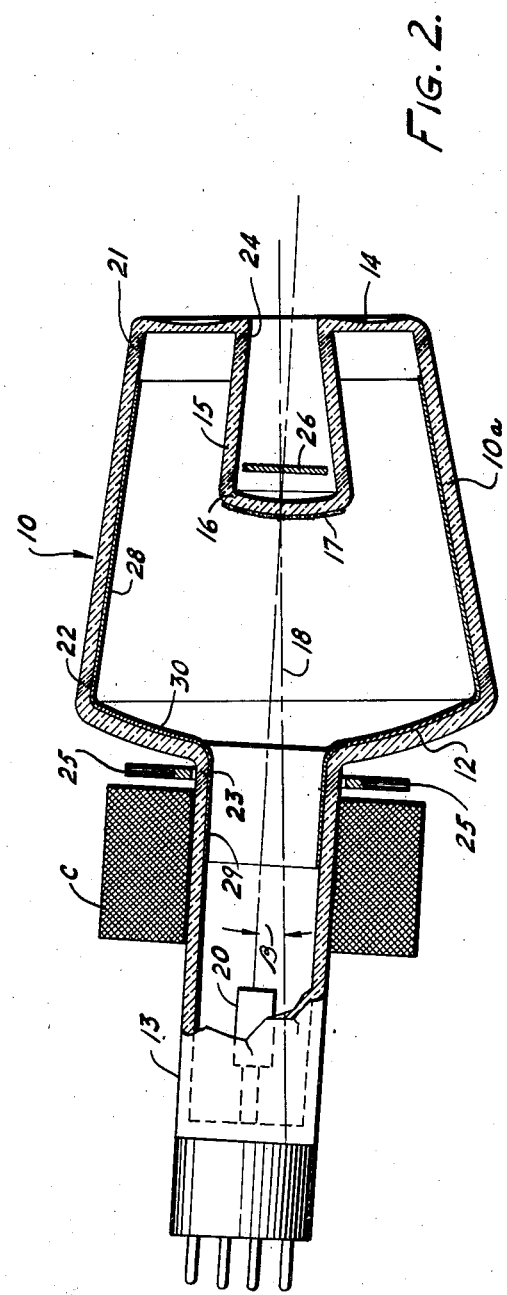

The manner in which the foregoing, together with other objects of the invention, may best be realized will be understood from a consideration of the following specification, taken in conjunction with the accompanying drawing, in which:

Figure 1 is an elevational view of a projection television system incorporating the combined cathode-ray tube and optical system of the present invention; and, Figure 2 is a cross-sectional illustration, on an enlarged scale, showing in detail the nature of the unitary electro-optical system.

Now making more detailed reference to the drawing, the exemplary embodiment illustrated therein includes, in general, a combined cathode-ray tube Schmidt-type optical system, designated by the reference character 10, and a viewing screen shown at 11. The combined system 10 comprises a generally cylindrical envelope 10a having at one end thereof a substantially spherical reflector 12 which is centrally apertured to accommodate the neck of the tube, shown fragmentarily at 13. At the opposite end of the envelope 10a is a correction element or plate 14 configured, as is now well known in this art, in such manner as to compensate for the spherical aberration introduced by the reflector 12. The correction plate is positioned substantially in a plane passing through the center of curvature of the mirror, and is provided with a central aperture from which leads a re-entrant envelope portion 15 carrying at its inner end a wall 16 upon which is deposited the fluorescent material 17 (see Figure 2) comprising the target or primary image screen. The surface 16 is also spherical and is curved about the center of curvature of the mirror 12. Preferably, the aperture in the reflector is at least as large as the target area.

The aforementioned components define an optical axis, represented at 18 and the distances: from the center of the primary image screen to the center of the spherical reflector; and from the spherical reflector backwardly along the optical axis 18 to the central portion of screen 11; are the conjugate distances of the system the absolute values of which are determined by the overall requirements of the particular projection apparatus under design. The target surface should be disposed substantially midway of the distance between the correction plate and the reflector. The absolute value of the spacings involved in this and other dimensions of the Schmidt system are not of importance in exposion of the features of the present invention. However, should complete dimensions of a representative embodiment of a Schmidt system be desired, reference may be had to the September, 1947 issue of "Electronics," beginning at page 84.

Since the operation of the spherical reflector and correcting element of such a Schmidt-type reflective system are now well known, more detailed discussion of the nature and functioning of these components is not necessary herein.

As best appears in Figure 2, the tube neck 13 houses the usual electron gun or other source of target excitation, shown at 20, and the beam therefrom is caused to scan the target surface 17 by the action of suitable focusing and deflecting coils diagrammatically represented at C, in conjunction with conventional electrical circuits, not illustrated. The light from the primary picture thus traced upon fluorescent screen 17 falls upon the surface of reflector 12 (which may be silvered as shown at 30) from which surface the light is directed to the annular correcting element 14 and thence to the surface of viewing screen 19. The "silvering" is best accomplished by the evaporation of aluminum, in a vacuum.

Preferably, the interior surfaces of both tubular envelope 10a and of that portion of the tube neck immediately adjacent the reflector are provided with a non-reflective conductive coating, indicated at 28 and 29. It is a feature of the invention that the silvered reflector cooperates with this conductive coating in such manner as to make it possible to use both the surface of the mirror and the aforesaid coating as the second anode of the cathode-ray tube circuits. As appears in Figure 2, the conductive coating extends into contact with the optical, silvered surface 30 of the reflector 12 and the conductive second anode may be extended forwardly within the envelope structure, to any desired extent. In fact, if such be desired, the conductive coating may be deposited about the re-entrant envelope portion 15, in which event a small conductor could readily be extended from the coating portion shown at 28, across the inner surface of the correcting element 14 and into contact with any additional coating provided upon the envelope portion 15.

It is a particular feature of this invention that such combined apparatus makes it possible to trace the primary image upon the forward face of the fluorescent material, from which the resulting illumination falls directly upon the reflector, thus increasing the optical efficiency of the system by obviating the necessity for light from the primary image passing through the screen material and the surface which supports the same. In accordance with known practice and in order to enhance the brilliance of the image, a reflective metallic coating may be interposed between the supporting surface 16 and the material comprising the fluorescent screen.

The above-described apparatus lends itself well to ready and economical manufacture, the optical elements 12 and 14 being manufactured in the usual way, as separate entities and preferably of glass, after which the correcting element may be glass welded or otherwise secured to the reentrant portion 15, and the fluorescent material may be settled upon the spherical surface 16. As will be understood from the drawing, the tube neck 13 is similarly joined to the reflector 12, after which both sub-assemblies may be glass welded to the tubular envelope 10a. As appears at 21, 22, and 23 and in order to prevent distortion of the optical surfaces during assembly of the unitary apparatus, the optical elements are provided with flange portions to which may be secured the envelope 10a and the tube neck 13, the points of securement being designated by finer cross-hatching and—in each case—being disposed intermediate the aforesaid flange portions and the adjacent portions of the envelope. Similarly, an annular flange 24 is provided about the central aperture of the correcting element, for securement to the glass tube which forms the re-entrant portion 15. The gun assembly is, of course, sealed within the tube neck 13 in conventional manner.

As is illustrated in the drawing, the apparatus of my invention may be employed under keystone projection conditions, that is, conditions under which the overall design of the projection apparatus makes it desirable to incline the viewing screen obliquely with respect to the optical axis. To accommodate this type of projection, the primary image surface 16 has a predetermined angular disposition (indicated at $\beta$ in the drawings) in a direction opposite to the obliquity of the viewing screen, whereby to prevent out-of-focus effects introduced by the angular disposition of the viewing screen. The gun 20 has, of course, a corresponding angular disposition. Since the present invention does not reside in the aforesaid angular disposition, per se, or in the functioning thereof, further and more detailed description is not required herein.

It is to be understood that, in practice, the electrical circuits are so designed as to secure a trapezoidal raster upon the target area, rather than a simple rectangle, and it is pointed out that the structure of the unitary tube and optical system of this invention is of such a nature as readily to accommodate the introduction of magnetic fields utilized in scanning of such a trapezoidal image. As fully set forth in the copending application of William E. Bradley, Serial No. 657,175, filed March 26, 1946, now Patent No. 2,459,732, issued January 18, 1949, and assigned to the assignee of the present application, a trapezoidal raster may be traced upon the fluorescent screen by associating, with the tube, magnets which produce fields effective to cause the electron beam to trace a generally wedge-shaped pattern. In the present instance, such fields may, for example, be provided by the utilization of a pair of magnets 25—25, adapted to produce a relatively weak field in the portion of the tube lying intermediate the gun and the fluorescent screen, the foregoing magnets being used in conjunction with an additional magnet, illustrated at 26, disposed within the re-entrant portion 15 and effective to produce a relatively strong magnetic field immediately adjacent to and in parallelism with the fluorescent screen. As will be understood, it is necessary to prevent the return flow of flux through the neck of the tube, and for this reason the pair of magnets 25—25 are connected by a suitable ferromagnetic strap, or the like, shown at 27 (Figure 1) and located outside of the tube neck. Alternatively, any of the known electrical methods of forming trapezoidal images may be utilized, if preferred. Since the present invention is not concerned with the specific apparatus employed to accomplish such trapezoidal pre-distortion, and since the principles of such pre-distortion are well known, description thereof need not be further extended here. In the event, however, that more detailed description of such pre-distortion and projection is desired, reference may be had to the above-identified issue of "Electronics," in which exemplary requirements for such projection are outlined in detail.

From the foregoing description it will be appreciated that the novel and advantageous concepts of the present invention make possible the realization of apparatus in which the entire electro-optical projection system is combined in a single unitary structure, completely sealed within an evacuated envelope. By such apparatus, as pointed out hereinabove, higher optical efficiency may be achieved and maintained, and optical registry is completed during the manufacture of the composite tube, no further focusing adjustments being required.

Also, it is to be noted that the present invention is advantageous in that the focus and deflecting coils, the tube neck, and the various supports and electrical connections, are all so located as not to interfere with the path of light projection. Additionally, manufacture, assembly and repair are greatly simplified by reducing the number of individual components which must be handled and adjusted.

I claim:

1. In electro-optical apparatus, a sealed envelope having a light reflector disposed in one portion thereof and an optical element disposed in another portion thereof, said optical element having an aspherical surface and being cooperatively arranged in spaced relation with said reflector and effective to correct for an aberration introduced by the reflector, a wall of said envelope having a re-entrant portion extending into the region between said reflector and optical element, a target screen supported upon said re-entrant portion and positioned to illuminate said reflector, said target screen being disposed in the mid-region of the distance between said reflector and said optical element, apparatus disposed within said envelope and effective to generate an electron beam and to cause said beam to scan said target screen, and means adapted to produce a magnetic field in the vicinity of said target screen, said last means being disposed within said re-entrant portion in a position accessible from the exterior of said sealed envelope.

2. In electro-optical apparatus, a sealed envelope having a light reflector disposed in one portion thereof and an optical element disposed in another portion thereof, said optical element having a surface cooperatively arranged in spaced relation with said reflector and being effective to correct for an aberration introduced by the reflector, a wall of said envelope having a re-entrant portion extending into the region between said reflector and optical element, a target screen supported upon said re-entrant portion and positioned to illuminate said reflector, said target screen being disposed in the mid-region of the distance between said reflector and said optical element, apparatus disposed within said envelope and effective to generate an electron beam and to cause said beam to scan said target screen, and means adapted to produce a magnetic field in the vicinity of said target screen, said last means being disposed within said re-entrant portion in a position accessible from the exterior of said sealed envelope.

3. A combined cathode-ray tube and optical system, comprising: a sealed generally cylindrical envelope having a substantially spherical mirror disposed at one end thereof and means disposed at the opposite end thereof and effective to correct for spherical aberration arising in said mirror; said correcting means being apertured in the generally central region thereof and in substantial alignment with the axis of the cylindrical envelope; a re-entrant envelope portion sealed about the edges of the aperture in said optical element and providing a supporting surface disposed within the sealed envelope in confronting relation with said mirror; a target screen supported upon said surface; means disposed within said envelope and adapted to generate a cathode-ray beam and to cause said beam to scan said target screen, and means adapted to produce a magnetic field in the vicinity of said target screen, said last means being disposed within said re-entrant portion in a position accessible from the exterior of said sealed envelope.

REYNOLDS D. BROWN, Jr.

REFERENCES CITED

The following references are of record in the file of this patent:

UNITED STATES PATENTS

| Number | Name | Date |
| --- | --- | --- |
| 2,440,735 | Cawein | May 4, 1948 |

FOREIGN PATENTS

| Number | Country | Date |
| --- | --- | --- |
| 557,771 | Great Britain | Dec. 3, 1943 |